United States Patent [19]

Euzen et al.

[11] 4,444,653

[45] * Apr. 24, 1984

[54] PROCESS AND DEVICE FOR WITHDRAWING SOLID PARTICLES AND INTRODUCING A LIQUID CHARGE AT THE LOWER PART OF A CONTACT ZONE

[75] Inventors: Jean-Paul Euzen, Dardilly; Yves Jacquin, Sevres, both of France

[73] Assignee: Institut Francais Du Petrole, Rueil-Malmaison, France

[*] Notice: The portion of the term of this patent subsequent to Jul. 12, 2000 has been disclaimed.

[21] Appl. No.: 463,183

[22] Filed: Feb. 2, 1983

[30] Foreign Application Priority Data

Feb. 2, 1982 [FR] France ................................ 82 01765

[51] Int. Cl.³ ...................... C10B 31/02; C10B 31/12
[52] U.S. Cl. ................................... 208/152; 208/166; 208/171; 422/143; 422/311; 34/57 A
[58] Field of Search ...................... 208/152, 166, 171; 422/143, 311; 34/57 A

[56] References Cited

U.S. PATENT DOCUMENTS

| 2,490,828 | 12/1949 | Newton | 208/171 |
| 2,897,138 | 7/1959 | Aroern | 208/171 |
| 3,370,361 | 2/1968 | Guerrieri | 34/57 A |
| 3,679,563 | 7/1972 | Pollock | 208/166 |
| 4,392,943 | 7/1983 | Euzen et al. | 208/152 |

FOREIGN PATENT DOCUMENTS 589879 7/1947 United Kingdom ................ 208/165

Primary Examiner—Delbert E. Gantz
Assistant Examiner—Lance Johnson
Attorney, Agent, or Firm—Millen & White

[57] ABSTRACT

Catalysts solid particles are supplied to a vertical reactor for the catalytic treatment of fluid charges, at the upper part of said reactor and are progressively withdrawn from the lower part thereof either continuously or periodically through a funnel having the shape of an inverted cone or an inverted pyramid. At least a portion of the charge is introduced at the lower part of the reactor through orifices above the walls of the funnel at a distance thereof from 1 to 500 times the average size of a catalyst particle.

13 Claims, 10 Drawing Figures

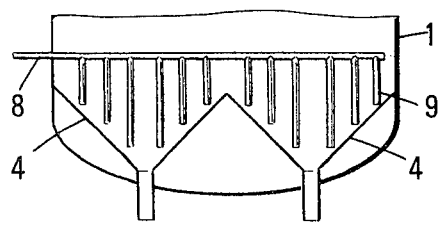
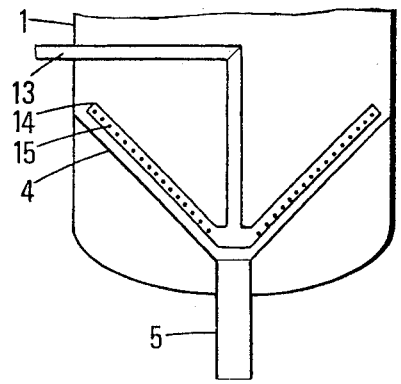
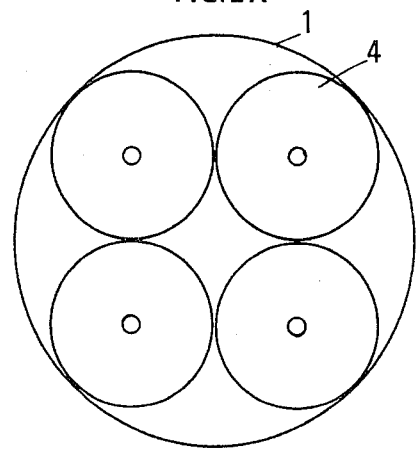
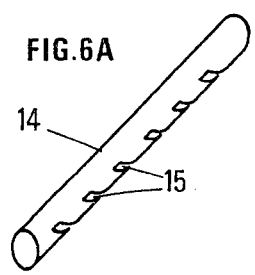
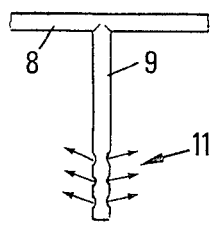
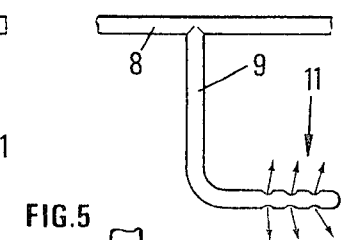
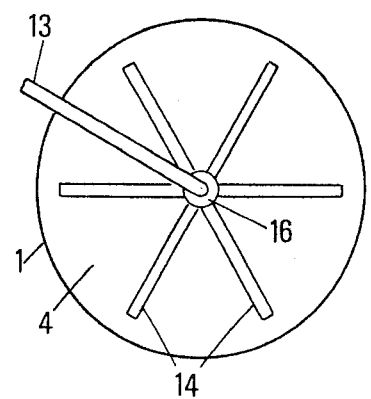
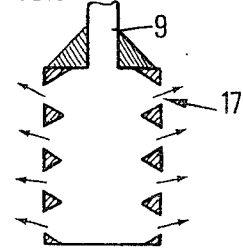

PROCESS AND DEVICE FOR WITHDRAWING SOLID PARTICLES AND INTRODUCING A LIQUID CHARGE AT THE LOWER PART OF A CONTACT ZONE

BACKGROUND OF THE INVENTION

This invention concerns a process and a device for the catalytic treatment of a fluid charge and, more particularly, for the conversion or hydroconversion of hydrocarbons.

The invention is particularly applicable to the catalytic treatment of liquid charges such, as for example, heavy crude oils or hydrocarbon vacuum distillation residues, these treatments being generally effected in the presence of hydrogen and/or gas mixtures of high hydrogen content, over a bed of solid catalyst, and the catalyst being used as particles (extrudates, particles of various shapes, balls etc.).

During such catalytic treatments, a rapid deactivation of the catalyst occurs as a result of the presence of catalyst poisons, of coke formation, of the deposition of certain metals, etc.

This deactivation requires a frequent replacement of the whole or a part of the catalyst bed.

SUMMARY OF THE INVENTION

According to the invention, the withdrawing of the catalyst from the reactor is effected progressively. By "progressively" it is meant that the catalyst may be withdrawn:

either periodically, for example, at intervals from 1/10 to 10 days, by withdrawing only a fraction at each time, for example, from 0.5 to 15% of the total catalyst amount. Larger catalyst amounts may be withdrawn according to the need and for example, up to 100% of the total catalyst amount, i.e., the totality of the catalyst. The rate of catalyst withdrawal may be higher (for example at intervals of the order of a minute or a second), the withdrawn amount being proportionally reduced; between the withdrawing periods, the reactor thus operates in fixed bed, or continuously; in this case, the reactor is of the moving bed type.

The fresh catalyst is introduced at the upper part of the reactor and the process and the devices for effecting the discharge of the used catalyst from the lower portion of the reactor through a discharge funnel are the object of the present invention.

The process of the invention and the devices according to the invention may also be used for withdrawing catalyst particles from reactors used for cracking, hydrocracking, hydroreforming, aromatic hydrocarbons production, paraffinic, naphthenic or aromatic hydrocarbons isomerization, various hydrogenation, dehydrogenation, alkylation, transalkylation, hydrodecyclization, hydrodealkylation reactions, etc. reactors wherein the injected charge and/or gas flow upwardly. The device and the process according to the invention are also convenient for all the enclosures where are handled liquids and/or gases or solid particles as particles of any size, provided that they can flow downwardly by gravitation effect or by means of a controlled gas leak driving said particles therewith. Thus, there can be mentioned in a non-limitative manner, the gravels, sands, pills, grains, granules, tablets, pellets of any kind used for pharmaceutics, confectionary, foodstuffs, etc.

Preferably, the fluid charge is introduced into the reactor, or into the enclosure containing particles, through distribution devices located at the lower part of the reactor or of the enclosure and flows countercurrently with the catalyst or the particles before being discharged, after treatment, at the upper part of the reactor (or of the enclosure which is arbitrarily called "reactor" in the following description).

The flow of catalyst or particles, by gravity, produces a smooth lowering of the catalyst bed or the particles bed (particles which are arbitrarily called "catalyst" hereinafter) whereas the upward flow of fluid charge makes possible, in particular, an easy adjustment of the residence time and provides for a continuous fluid phase.

Moreover, the flow in counter-current of the charge and the catalyst makes it possible to obtain a high catalytic conversion rate since the fresh catalyst introduced at the top of the reactor treats an almost converted charge (i.e. containing essentially compounds whose conversion is difficult) whereas, at the bottom of the reactor, the used catalyst treats a fresh charge (i.e. containing a high proportion of compounds easy to convert), thereby efficiently the first step of the conversion. It results therefrom an extensive use of the catalyst in the reactor, a thermal profile of the catalyst bed more regular than in a circulation of the co-current type with, in particular, at the bottom of the reactor, a more moderate temperature reducing the liability of catalyst coking.

A catalytic conversion process with moving bed is known from U.S. Pat. No. 3,826,737. This process is however more particularly adapted to a co-current flow of the catalyst and the liquid charge, the latter being discharged at the bottom of the reactor through a cylindrical grid placed at the bottom of the catalyst discharge cone.

Such a process suffers from the disadvantage of a possible clogging of the grid by the catalyst particles pushed against said grid by the liquid stream discharged from the bottom of the reactor. It may result therefrom an irregular distribution of the fluids in the catalyst bed, a difficult flow of the catalyst bed, with the liability of blocking certain zones thereof, as well as an increased abrasion of the catalyst by friction between blocked particles and free particles of the catalyst bed and between free catalyst particles and the grid wherethrough the liquid stream is discharged.

The object of the invention is to provide a technique which avoids the above-mentioned disadvantages.

This result is obtained by a process for withdrawing granulated solid particles from a generally confined space and introducing into said space a fluid charge consisting of at least one liquid, said generally confined space having substantially the shape of an elongate volume of revolution and being substantially vertical, the solid particles being introduced at the upper part of the enclosure and progressively withdrawn from the lower part of the enclosure after having progressed downwardly therethrough, whereas the fluid charge is introduced at least partly at the lower part of said enclosure and is withdrawn from the upper part thereof after having progressed upwardly therethrough, said process being characterized in that the solid particles are withdrawn from the lower end of a flared zone having the shape of an inverted cone or an inverted pyramid, i.e. of a cone or a pyramid whose apex is turned downwardly, said apex being provided with an opening of convenient size for discharging solid particles, the surface of the walls of said flared zone being substantially continuous i.e. without roughnesses and without openings such as slots or perforations, the process being further characterized in that at least a portion of the fluid charge is introduced in the lower part of said enclosure through at least two orifices located above said walls, each orifice being at a distance from said walls at least equal to the average size of a solid particle and at most equal to about 500 times the average size of a solid particle, said distance being preferably from 4 to 50 times the average size of a catalyst solid particle and, in most cases, lower than 10 cm, for example about 5 cm.

BRIEF DESCRIPTION OF THE DRAWINGS

The invention is illustrated by the accompanying drawings wherein:

FIGS. 2 and 2A respectively show in axial cross-section and transverse cross-section another embodiment with several catalyst discharge funnels.

FIGS. 3 to 6, 6A and 6B illustrate different embodiments of the means for introducing the fluid charge.

FIGS. 1 and 1A diagrammatically show a first embodiment of a device for the catalytic treatment, for example with a moving bed.

DETAILED DESCRIPTION OF THE INVENTION

Figure 1:
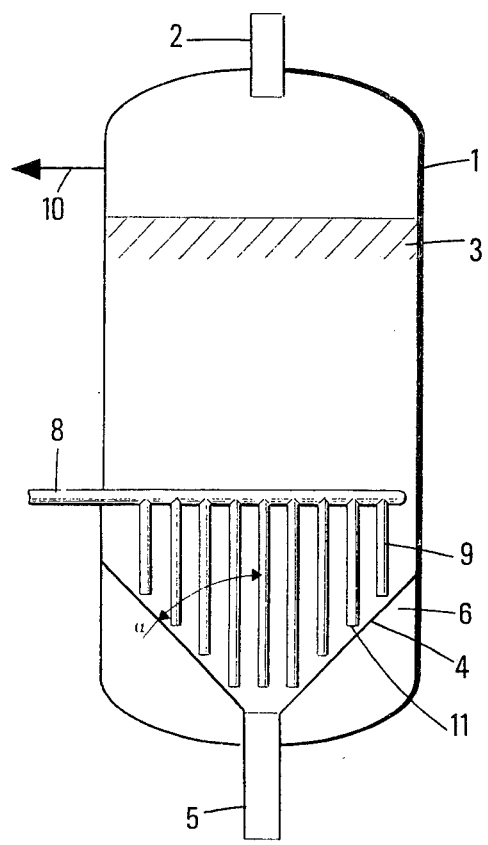
FIGS. 1 and 1A respectively show an axial cross-sectional view and a transverse cross-section of a device according to the invention with a single catalyst discharge funnel.

Reactor 1 comprises, at its upper part, means for introducing fresh catalyst (new or regenerated) diagrammatically shown as line 2 wherefrom the catalyst particles are supplied to feed a catalyst bed 3.

The catalyst flows by gravity in the reactor and is discharged from line 5, at the lower part 6 of reactor 1, through a discharge funnel 4. This funnel, which has in the present case the shape of an inverted cone, is free of roughnesses and of any openings such as holes, slots or perforations.

The angle $\alpha$ of the cone axis (or the pyramid axis if the funnel has a pyramidal shape) with one of the cone generatrices (or one of the pyramid edges) is comprised between 10° and 80°, preferably between 30° and 40°. At least a part of the fluid charge is introduced at the lower part of the reactor 1 through means comprising at least a distribution ramp 8 feeding a plurality of vertical injection pipe legs 9.

This fluid charge, which may consist of one or two phases, (liquid or/and gas), flows upwardly in the reactor counter-currently with the catalyst before being discharged at the upper part of the reactor through gathering and discharge means diagrammatically shown as line 10 having, for example, the shape of a rake formed of collector tubes connected to a discharge duct.

The injection pipes, (or legs), are distributed inside funnel 4 with a sufficient spacing so that the catalyst particles are not jammed or slowed down or braked between these pipes.

Pipes 9 have different lengths (depending on their distance from the reactor walls or from the central part of said reactor or on the number of flared zones), (see FIG. 2), and open at the bottom of the catalyst bed through orifices 11 at short distance from the walls of the funnel, as previously indicated.

Figure 1A:
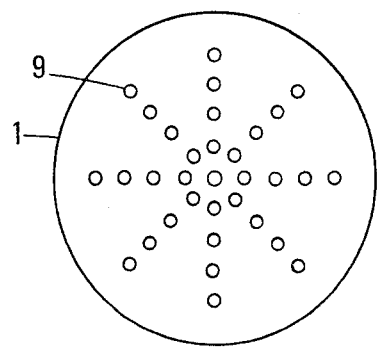

FIG. 1A shows a cross-sectional view of the reactor section 1 and of the section of pipes 9, opening in the vicinity of the walls of the funnel.

FIGS. 2 and 2A diagrammatically show an embodiment wherein the catalyst is discharged through several discharge funnels. Only the bottom of a reactor 1 and the funnels such as 4 are shown in FIGS. 2 and 2A, and the pipes 9 and the ramp 8 in FIG. 2. The cross-sectional view of FIG. 2A thus shows 4 funnels, two of them only being apparent in FIG. 2, in axial cross-section.

The number of discharge funnels 4 depends on the reactor geometry, on the constructional mechanical requirements and on the desired uniformity of the paths for the catalyst particles through the various reactor sections.

Another withdrawing mode provides for an easy adjustment of the catalyst flow rate independently from that of the fluid charge and makes possible at will a continuous discharge (moving bed) or a discontinuous discharge (fixed bed) of the catalyst.

As far as FIGS. 1 and 2 are concerned, the fluid charge distribution pipes are arranged vertically and at regular intervals along the entire reactor section up to the vicinity of the wall of the one or more catalyst discharge funnels.

When the fluid charge comprises several phases, the latter may be supplied either separately or as a mixture in the desired proportions for the conversion to a gas-liquid mixed phase.

The distribution pipes comprise, at their lower part, means for injecting at least a portion of the fluid charge, diagrammatically shown as hole 11 in FIG. 1. Said injection means is provided with at least one orifice: this injection means may be of different types:

FIG. 3 shows a ramp 8 and a pipe leg 9 whose injection means consists of a vertically arranged perforated end; the small arrows indicate the fluid direction when it is injected through said orifices of the pipe end.

It is also possible to make simultaneous use, in the reactor, of pipes with ends oriented horizontally or vertically or in any other direction.

According to another embodiment (FIG. 5), the fluid charge injection means may consist of small cylindrical nozzles or screened pipes 17 of a diameter larger than that of the distribution pipes 9, said nozzles being arranged vertically and having substantially horizontal slots for the admission of the fluid charge.

The upper portion of these nozzles may preferably be profiled so as to facilitate as much as possible the flow of the catalyst particles.

These admission means of the fluid charge are all placed at a small distance above the wall of the one or more discharge funnels, as above indicated.

The arrangement according to the invention provides for a homogeneous circulation of the catalyst bed and of the fluid charge throughout the reactor without slowing down the catalyst flow by the distribution system or by the wall of the one or more discharge funnels.

Optionally, it is possible to proceed to a secondary fluid injection at the bottom of the one or more discharge funnels in order to prevent the packing of the catalyst at the lower part of the catalyst bed and to completely eliminate any liability of catalyst coking.

The fluid used for said secondary injection may be hydrogen or a small fraction, (about 1%, for example), of the converted charge issued from the upper part of the reactor, optionally after cooling thereof.

FIG. 6 shows another device for injecting into reactor 1 at least a part of a fluid charge consisting of at least one liquid and/or gas phase. The charge is at least partly introduced through the pipe system 13 which penetrates substantially horizontally inside the reactor and then follows a path substantially coinciding with the funnel axis, (a single funnel 4 is shown in FIG. 6), down to the vicinity of the funnel bottom and of the catalyst discharge orifice 5, said pipe system being divided into a bundle of tubes or branches 14 which raise along the walls of the funnel substantially parallelly to said walls, said tubes being, for example, provided with orifices 15 for injecting the charge. The device is thus formed of several tubes 14 which may be, for example, perforated as shown in FIG. 6, (preferably with downwardly oriented perforations), or, still for example, provided with circular or semi-circular slots, downwardly oriented as shown in FIG. 6A (tube 14 and orifices 15 shaped as slots).

FIG. 6B is a cross-sectional view, from above, of the device, showing reactor 1, branches such as 14 upwardly oriented and parallel to certain generatrices of the funnel 4, arranged as the ribs of an overturned umbrella. These tubes, connected together at the level of their lower part 16, are fed through the pipe system 13, first horizontal when penetrating inside the reactor, then substantially vertical and located at the center of the branches and generally coinciding with the axis of funnel 4 (or of each funnel in the case of several funnels).

Each of the injection tubes (14 in FIGS. 6 and 6B) is close to the corresponding generatrix of the funnel cone, with the allowance between the cone and the tube 14 of a sufficient space to give free passage to the catalyst particles flowing down along the funnel.

The cross-sectional areas of the different injection tubes 14 are such that the optional separation of the phases forming the fluid charge is made impossible by the turbulence phenomena.

The perforations or the slots of the injection tubes, as above indicated, are preferentially oriented downwardly, so as to avoid their clogging by catalyst fragments, and also in order to irrigate the catalyst bed in a systematic manner and, particularly, up to the vicinity of the funnel along which the catalyst slides.

What is claimed is:

1. A process for withdrawing granulated solid particles from a generally confined space and introducing into said space a charge of fluid consisting at least of a liquid, said generally confined space having substantially the shape of an elongate volume of revolution, substantially vertical, the solid particles being introduced at the upper part of the enclosure after having downwardly progressed through said enclosure, whereas the fluid charge is introduced at least in major part at the lower portion of said enclosure and is withdrawn from the upper portion after having upwardly progressed through said enclosure, and said process comprising withdrawing the solid particles from the lower end of a flared zone having the shape of an overturned cone or pyramid whose apex is oriented downwardly, said apex being provided with at least one opening of a sufficient size for the discharge of the solid particles, the surface of the walls of said flared zone being substantially continuous, and the process further comprising injecting at least a portion of the fluid charge in the lower part of said enclosure through at least two orifices located above said walls, each injection orifice being at a distance from said walls at least equal to the average size of a solid particle and at most equal to about 500 times the average size of a solid particle.

2. A process according to claim 1 for withdrawing catalyst particles from a reaction zone and for introducing into said zone a fluid charge consisting of at least a liquid and a gas of high hydrogen content, said zone having a substantially elongate cylindrical shape and being substantially vertical, the catalyst particles being introduced at the upper part of the reaction zone and progressively withdrawn from the lower part of the reaction zone after having progressed downwardly through said reaction zone, while the fluid charge is introduced at least partly in the lower part of said reaction zone and is withdrawn from the upper part thereof, after having progressed upwardly through the reaction zone, and said process comprising withdrawing the catalyst particles from the lower end of a flared zone having the shape of an inverted cone or an inverted pyramid whose apex is overturned downwardly, said apex being provided with a least one opening of the required size for the discharge of the catalyst particles, the surface of the walls of said zone being substantially continuous, and the process further comprising introducing at least a portion of the fluid charge in the lower part of said reaction zone through at least two orifices located above said walls, each orifice being at a distance from said walls at least equal to the average size of a catalyst particle and at most equal to about 500 times the average size of a catalyst particle.

3. A process according to claim 2, wherein the average angle between the cone axis or the pyramid axis and one of the cone generatrices or one of the pyramid edges is comprised between 10° and 80°.

4. A process according to claim 3, wherein said angle is comprised between 30° and 40°.

5. A process according to claim 4, wherein, in addition, each of said orifices for introducing at least a portion of the fluid charge is located at a distance from said walls of the flared zone comprised between 4 and 10 times the average size of a catalyst particle.

6. A process according to claim 5, wherein at least the part of the fluid charge which is introduced into the reaction zone through said orifices is introduced into the reaction zone through a main line substantially horizontal which is subdivided into several lines extending substantially vertically inside the reaction zone and at the lower ends of which said orifices are provided.

7. A process according to claim 5, wherein at least the portion of the fluid charge which is introduced into the reaction zone through said orifices is introduced into the reaction zone through one main line generally substantially horizontal which is then subdivided in at least one pipe per flared enclosure, said pipe extending substantially vertically along the axis of each cone or of each pyramid and being subdivided in the vicinity of the apex of said cone or of said pyramid into a plurality of pipes substantially parallel to the generatrices of the cone or to the walls of the pyramid, said orifices being provided along said pipes.

8. A process according to claim 1, wherein the fluid charge consists of a liquid and a gas, the liquid being introduced through said orifices and the gas being injected separately.

9. An apparatus for carrying out a process for withdrawing catalyst particles from a reaction zone and for introducing into said zone a fluid charge consisting of at least a liquid and a gas of high hydrogen content, said zone having a substantially elongate cylindrical shape and being substantially vertical, the catalyst particles being introduced at the upper part of the reaction zone and progressively withdrawn from the lower part of the reaction zone after having progressed downwardly through said reaction zone, while the fluid charge is introduced at least partly in the lower part thereof, after having progressed upwardly through the reaction zone, and said process comprising withdrawing the catalyst particles from the lower end of a flared zone having the shape of an inverted cone or an inverted pyramid whose apex is overturned downwardly, said apex being provided with at least one opening of the required size for the discharge of the catalyst particles, the surface of the walls of said zone being substantially continuous, and the process further comprising introducing at least a portion of the fluid charge in the lower part of said reaction zone through at least two orifices located above said walls, each orifice being at a distance from said walls at least equal to the average size of a catalyst particle and at most equal to about 500 times the average size of a catalyst particle, and the apparatus comprising a reactor (1), means (2) for introducing fresh catalyst at the upper part of the reactor, discharge means for discharging the used catalyst from the lower part of said reactor, said discharge means comprising at least one discharge funnel (4) of conical or pyramidal shape, whose apex is oriented downwardly, said apex being surrounded with an opening (5) of sufficient size for discharging the used catalyst outside from the reactor, means (8) for introducing the fluid charge at the lower part of the reactor and means (10) for discharging the fluid charge treated at the upper part of the reactor, and comprising the combination of:

(a) at least said discharge funnel (4) whose walls are free of roughnesses and perforations, the angle formed between the axis of said funnel and one of the cone generatrices, when said funnel is of conical shape, or one of the edges of the pyramid, when said funnel is of pyramidal shape, being comprised between 10° and 80°, and (b) orifices (11) provided on pipes (9) for introducing at least a portion of the fluid charge, said orifices being provided above said walls and at a distance from said walls at most equal to about 10 cm.

10. An apparatus according to claim 9, wherein the orifices are located in the vicinity of the lower end of a plurality of substantially vertical pipes, the spacing between the adjacent pipes of any pair being sufficient for avoiding the slowing down of the catalyst particles, said plurality of pipes being fed from at least one substantially horizontal pipe.

11. An apparatus according to claim 9, wherein said pipes for introducing the charge comprise at their lower part a perforated end part whose perforations constitute said orifices, said end part being substantially vertical or substantially horizontal.

12. An apparatus according to claim 11, wherein said pipes for introducing the charge have an end part of larger diameter at the vicinity of their lower part, which form screened pipes, these end parts being vertical and having horizontal slots for the admission of the fluid charge.

13. An apparatus according to claim 9, wherein the introduction of at least a portion of the charge is effected through at least one pipe penetrating substantially horizontally inside the reactor and then following a path substantially coinciding with the axis of the funnel, down to the bottom of said funnel, said pipe being then subdivided into a bundle of upwardly directed tubes or branches substantially parallel to the walls of the funnel, said tubes being provided with orifices wherethrough is effected the injection of a portion of the charge, said orifices consisting of perforations or slots, said perforations or slots being downwardly oriented.

* * * * *